United States Patent
Barnes et al.

(10) Patent No.: US 10,981,331 B2
(45) Date of Patent: Apr. 20, 2021

(54) ADDITIVE MANUFACTURING

(71) Applicant: HEWLETT-PACKARD DEVELOPMENT COMPANY, L.P., Houston, TX (US)

(72) Inventors: Arthur H. Barnes, Vancouver, WA (US); Wesley R. Schalk, Vancouver, WA (US); Matthew A. Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 148 days.

(21) Appl. No.: 16/075,430

(22) PCT Filed: Oct. 19, 2016

(86) PCT No.: PCT/US2016/057730
§ 371 (c)(1),
(2) Date: Aug. 3, 2018

(87) PCT Pub. No.: WO2018/075033
PCT Pub. Date: Apr. 26, 2018

(65) Prior Publication Data
US 2019/0039303 A1 Feb. 7, 2019

(51) Int. Cl.
*B29C 64/236* (2017.01)
*B33Y 10/00* (2015.01)
(Continued)

(52) U.S. Cl.
CPC .......... *B29C 64/236* (2017.08); *B29C 64/165* (2017.08); *B29C 64/205* (2017.08);
(Continued)

(58) Field of Classification Search
CPC ............................ B29C 64/165; B29C 64/236
See application file for complete search history.

(56) References Cited

U.S. PATENT DOCUMENTS 7,008,209 B2  3/2006  Iskra et al.
7,389,154 B2  6/2008  Hunter et al.
(Continued)

FOREIGN PATENT DOCUMENTS

CN  204036858 U  12/2014
CN  205326292 U  6/2016
(Continued)

OTHER PUBLICATIONS

Hipolite, "3D-proto Creates Unique Dual 'Parking' Extruder System for 3D Printers" Retrieved from Internet: https://3dprint.com/26590/dual-parking-extruder/, Nov. 24, 2014, 11 pages.

*Primary Examiner* — Timothy Kennedy
(74) *Attorney, Agent, or Firm* — Dierker & Kavanaugh PC

(57) ABSTRACT

In one example, a fusing system for an additive manufacturing machine includes a first carriage carrying a layering device and a fusing lamp, and a second carriage carrying a fusing agent dispenser. The first carriage and the second carriage are movable back and forth over the work area along the same line of motion so that the first carriage follows the second carriage in one direction and the second carriage follows the first carriage in the other direction.

5 Claims, 15 Drawing Sheets

(51) Int. Cl.
  *B33Y 30/00*  (2015.01)
  *B29C 64/165*  (2017.01)
  *B29C 64/264*  (2017.01)
  *B29C 64/205*  (2017.01)
  *B29C 64/227*  (2017.01)
  *B29C 64/386*  (2017.01)
  *B29C 64/209*  (2017.01)
  *B33Y 50/02*  (2015.01)

(52) U.S. Cl.
  CPC .......... *B29C 64/209* (2017.08); *B29C 64/227* (2017.08); *B29C 64/264* (2017.08); *B29C 64/386* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2002/0105114 A1 | 8/2002 | Kubo et al. |
| 2008/0211132 A1 | 9/2008 | Feenstra |
| 2010/0247742 A1* | 9/2010 | Shi ........................ B33Y 40/00 427/8 |
| 2011/0059247 A1 | 3/2011 | Kuzusako et al. |
| 2015/0246483 A1* | 9/2015 | Goto ..................... B29C 64/165 428/206 |
| 2016/0243619 A1* | 8/2016 | Gothait ................... B28B 1/001 |
| 2016/0263829 A1* | 9/2016 | Okamoto ............... B33Y 30/00 |
| 2016/0297143 A1* | 10/2016 | Ganapathiappan ... B29C 64/165 |

FOREIGN PATENT DOCUMENTS

| | | | |
|---|---|---|---|
| EP | 2572864 A1 * | 3/2013 | ........... B29C 64/236 |
| JP | 2016168704 | 9/2016 | |
| WO | WO-2007114895 A2 * | 10/2007 | .......... B29C 64/165 |
| WO | WO-2009145069 | 12/2009 | |
| WO | 2015106838 A1 | 7/2015 | |
| WO | WO 2015167520 | 11/2015 | |
| WO | WO 2016053312 | 4/2016 | |
| WO | WO 2016080993 | 5/2016 | |
| WO | 2016083234 A1 | 6/2016 | |
| WO | 2016119898 A1 | 8/2016 | |

* cited by examiner

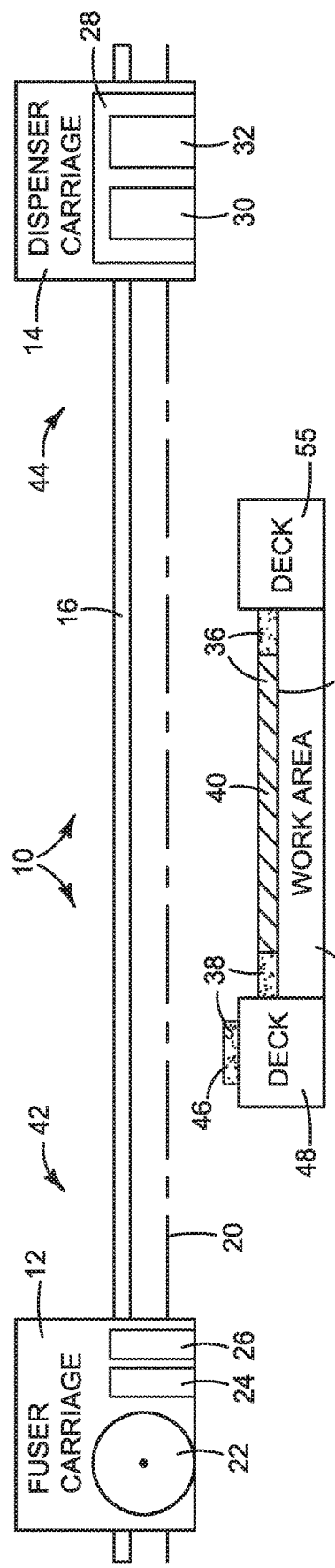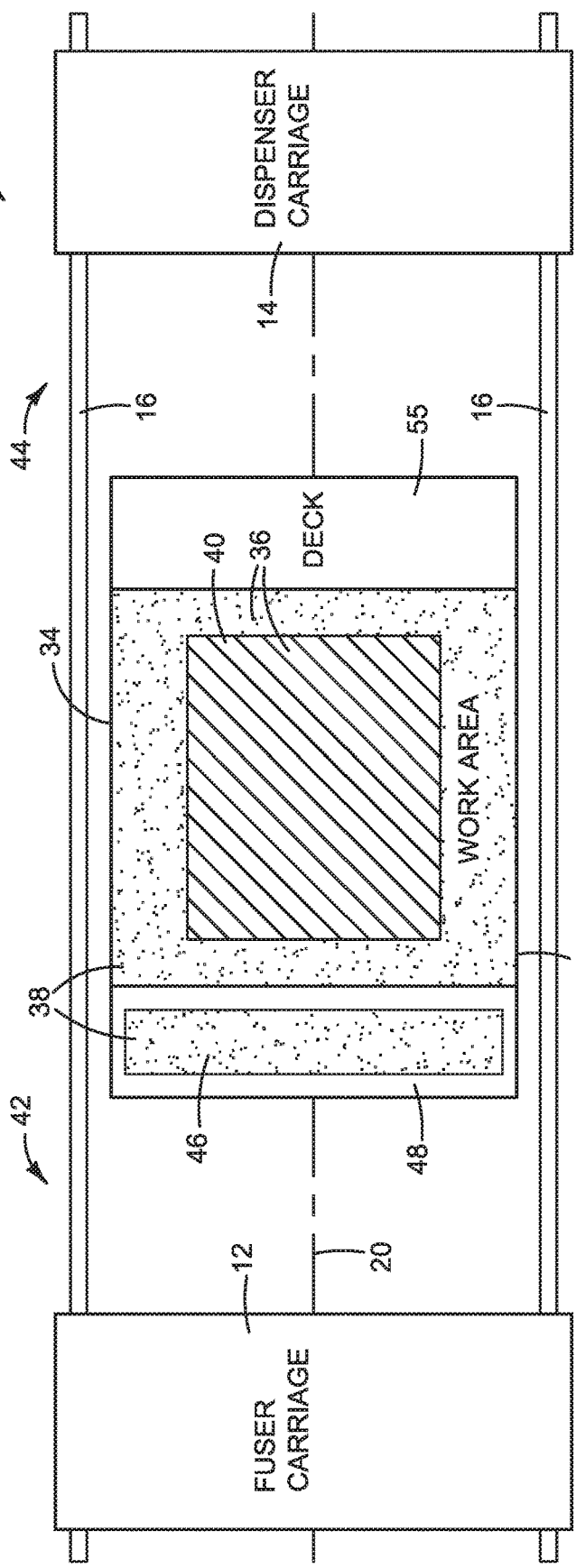

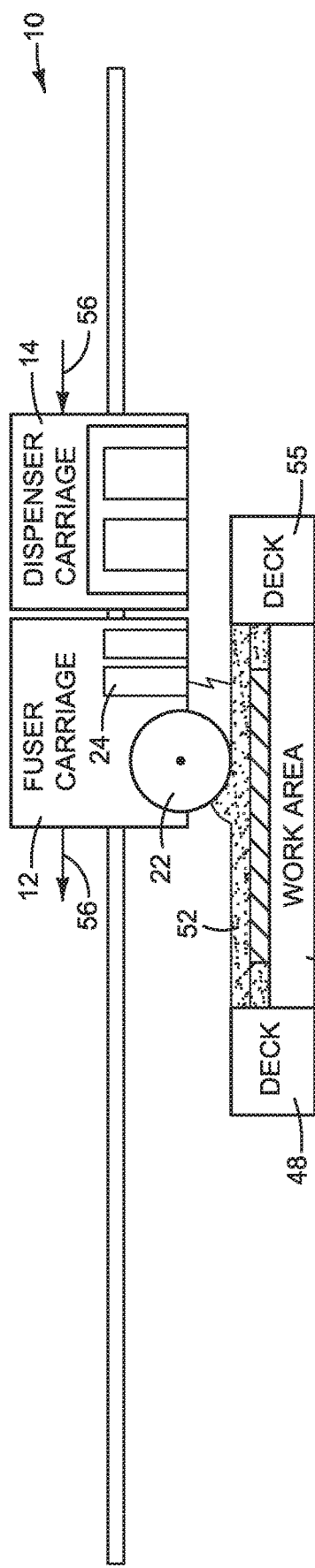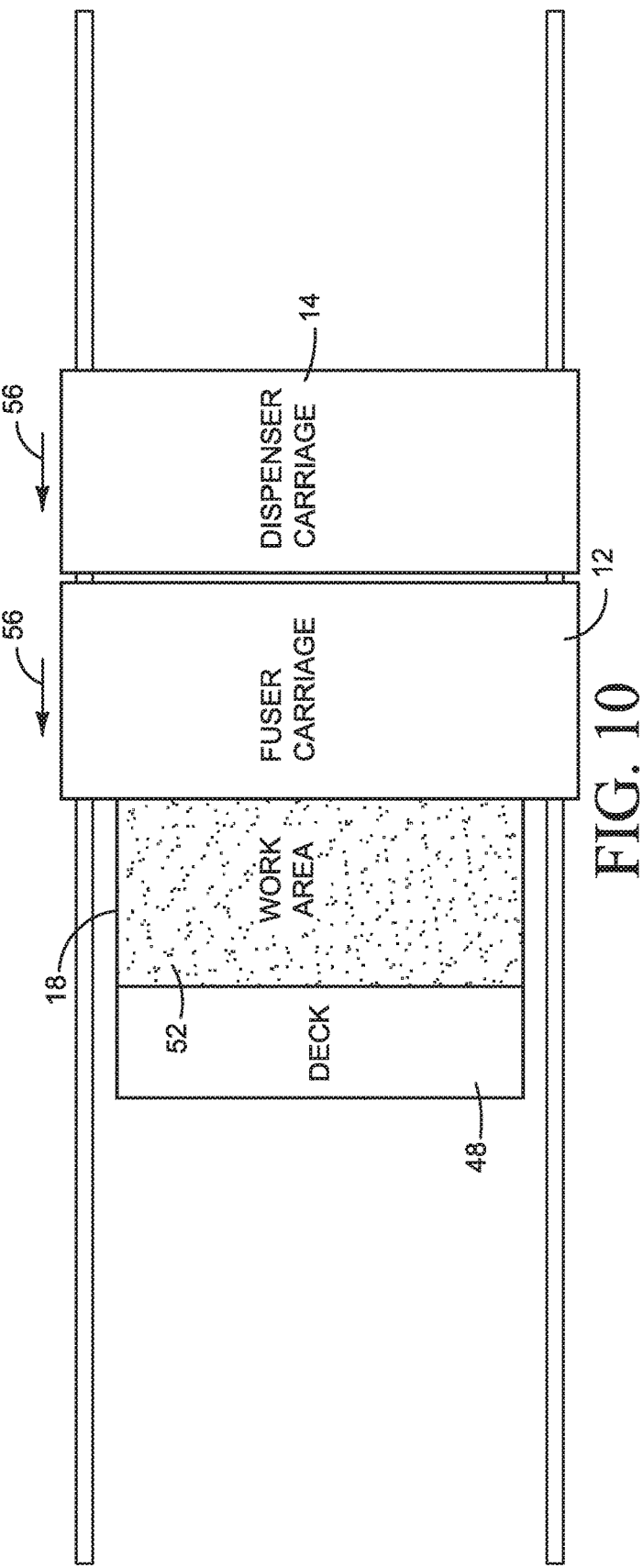

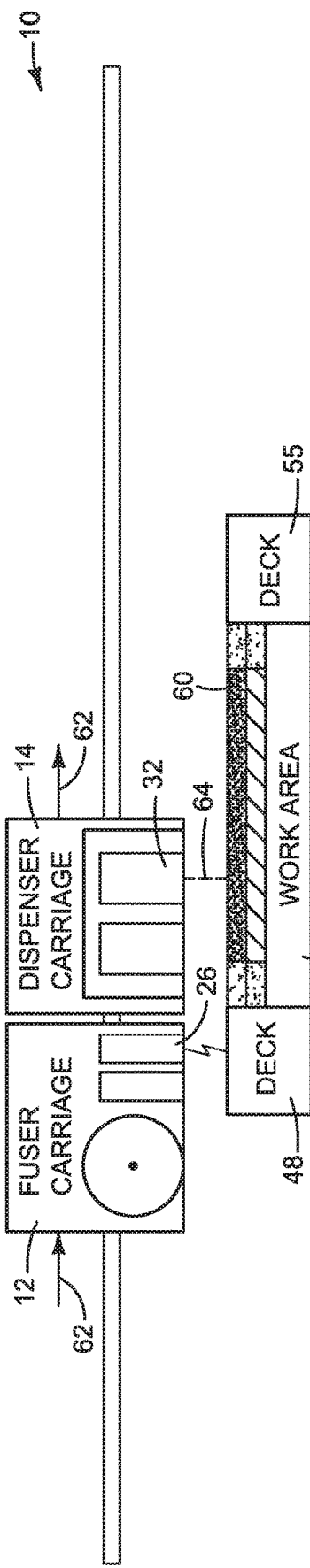
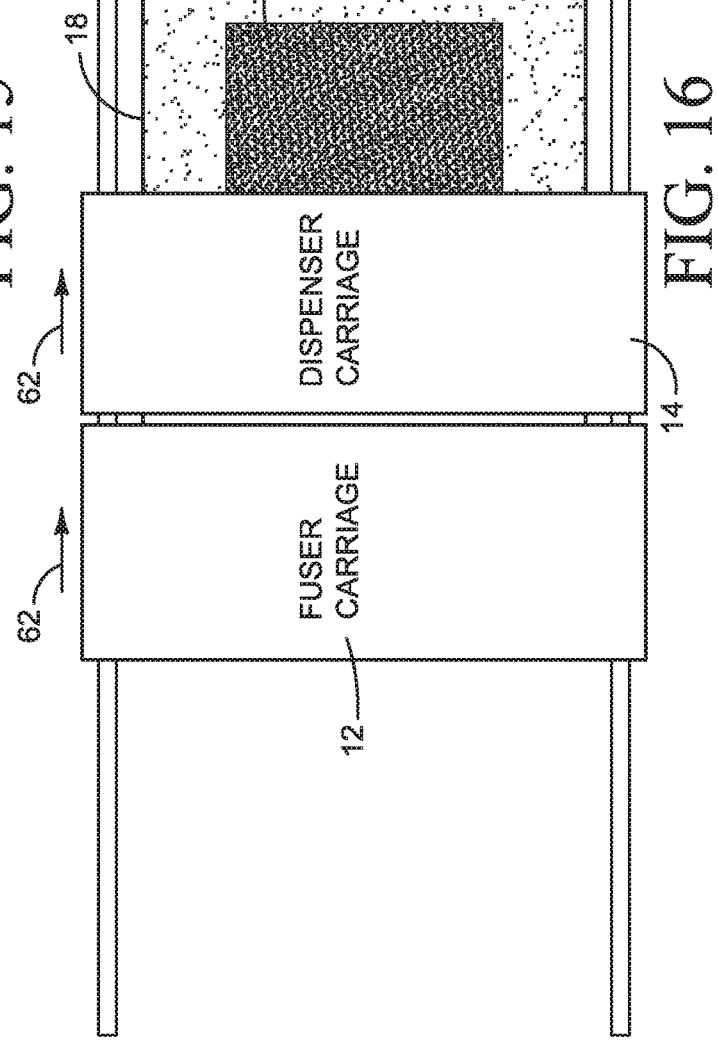
FIG. 15
FIG. 16

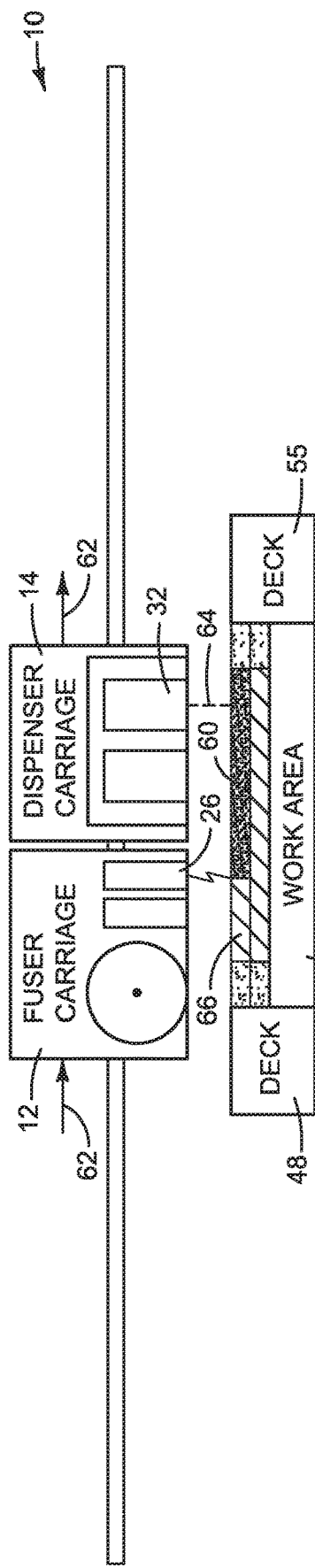
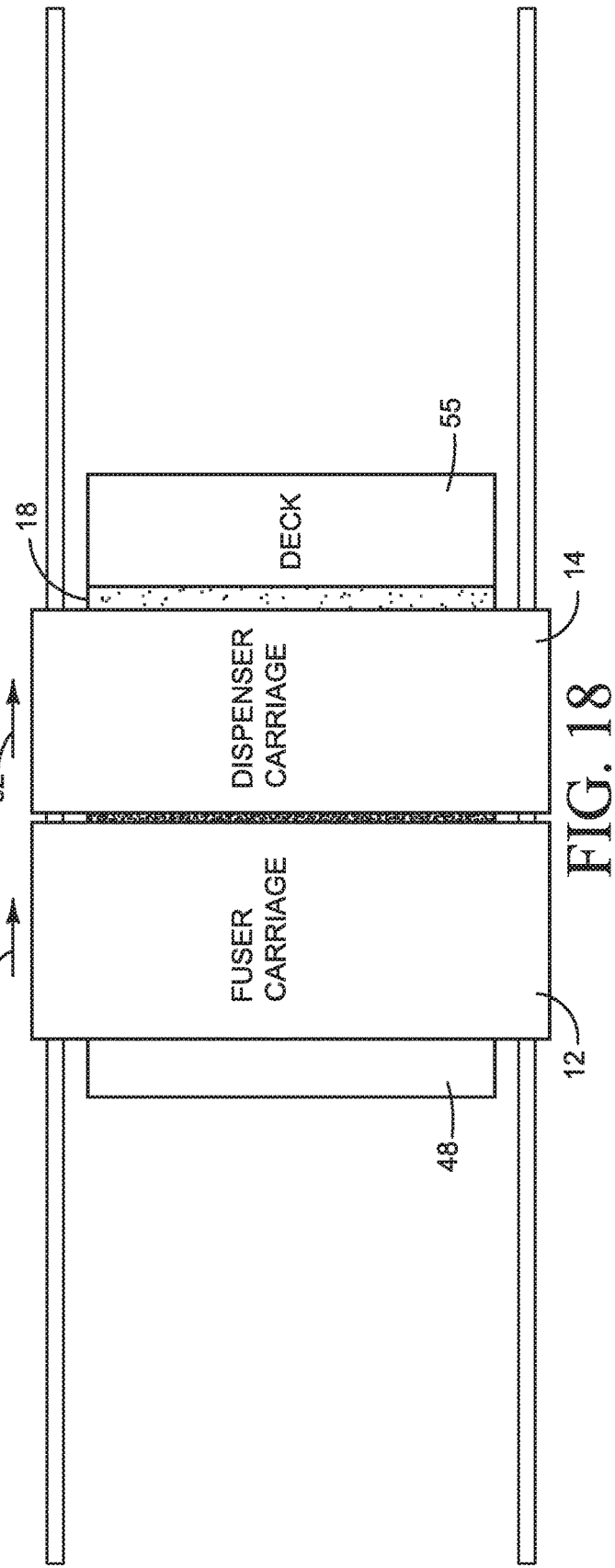

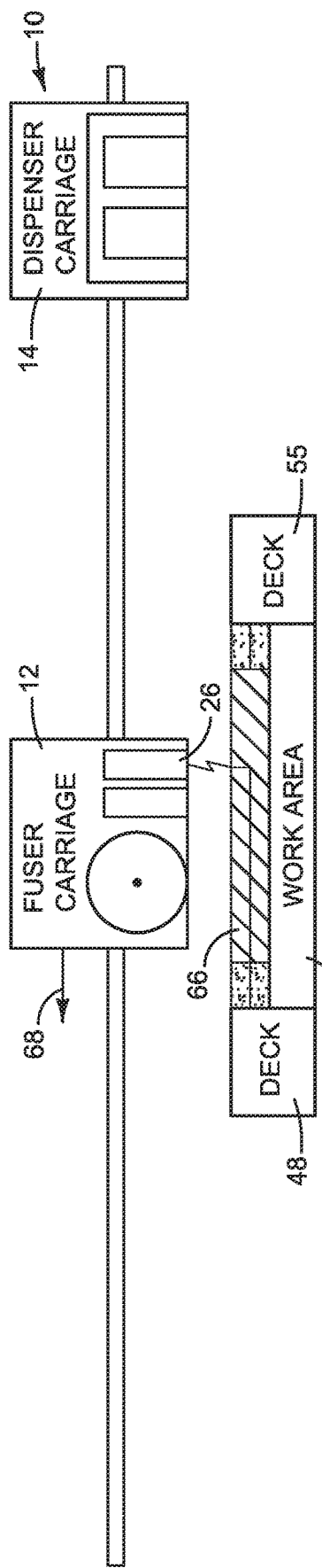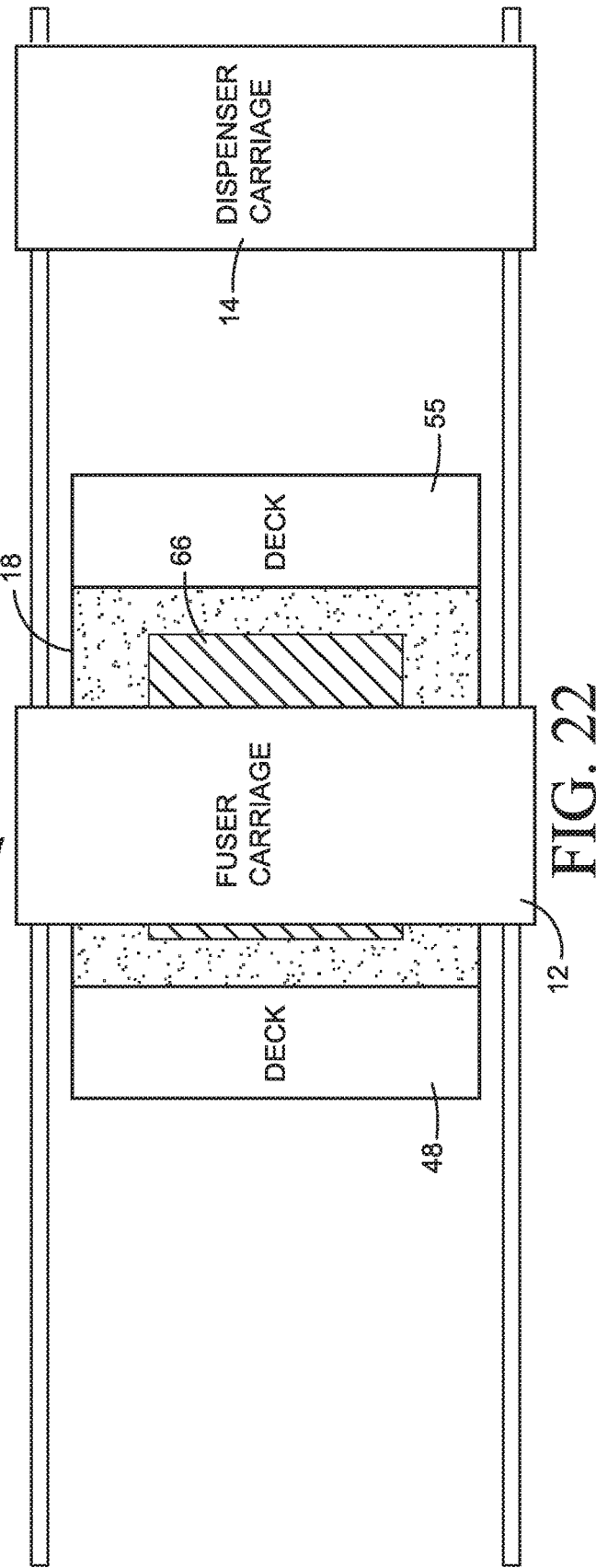

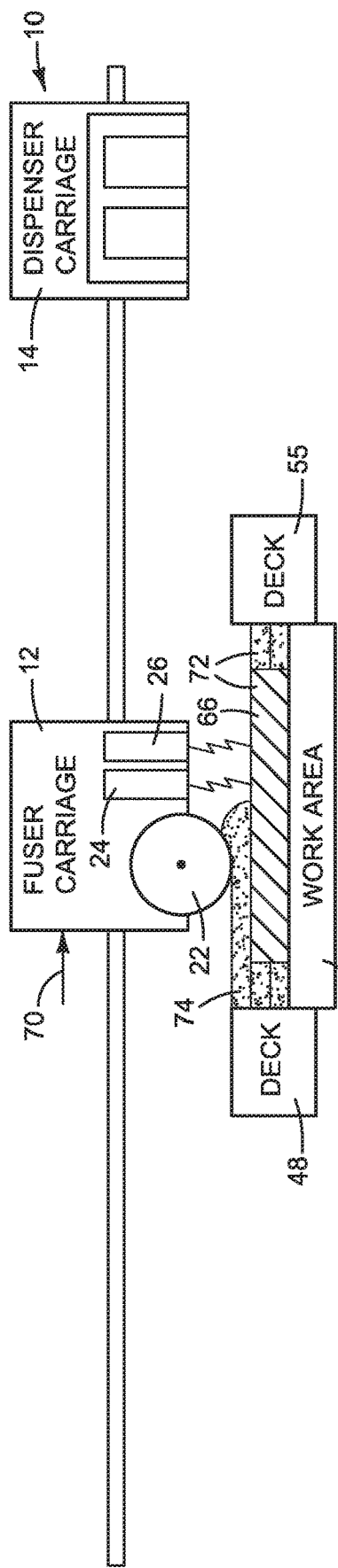
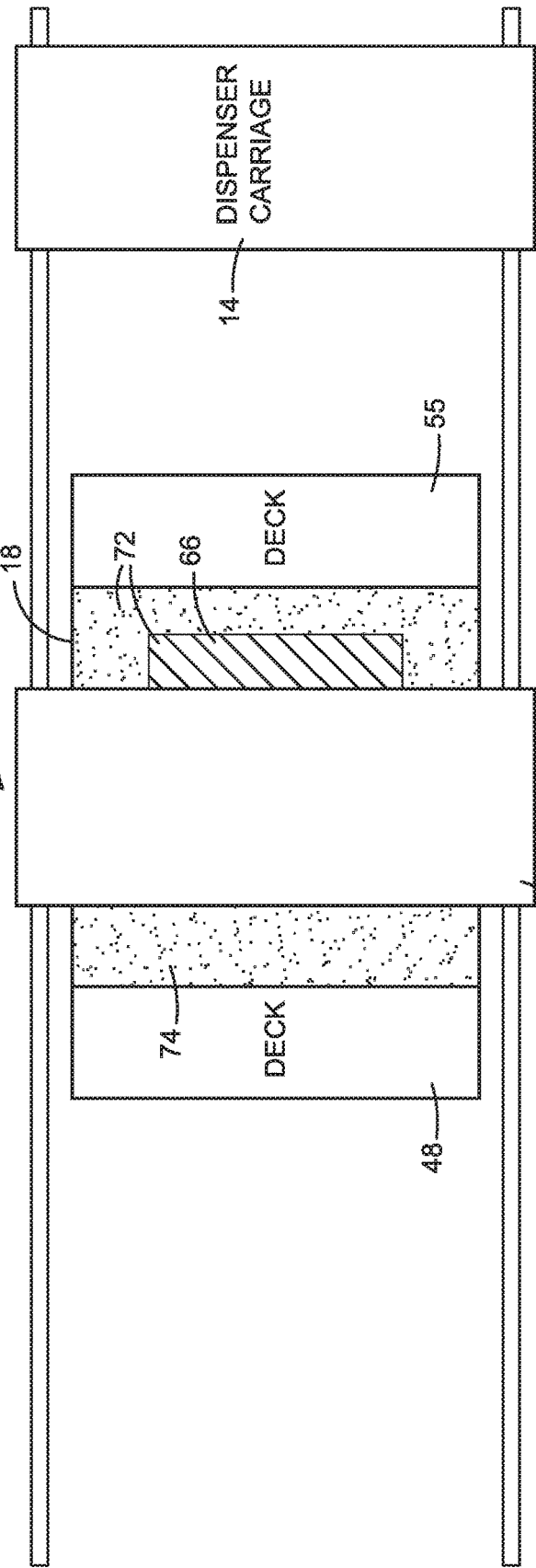

ADDITIVE MANUFACTURING

BACKGROUND

Additive manufacturing machines produce 3D objects by building up layers of material. Some additive manufacturing machines are commonly referred to as "3D printers." 3D printers and other additive manufacturing machines make it possible to convert a CAD (computer aided design) model or other digital representation of an object into the physical object. The model data may be processed into slices each defining that part of a layer or layers of build material to be formed into the object.

DRAWINGS

FIGS. 1 and 2 are elevation and plan views, respectively, illustrating one example of a fusing system for an additive manufacturing machine.

FIGS. 3-26 present a sequence of views showing one example of a four pass fusing cycle using the fusing system of FIGS. 1 and 2.

The same part numbers designate the same or similar parts throughout the figures. The figures are not to scale.

DESCRIPTION

Figure 3:
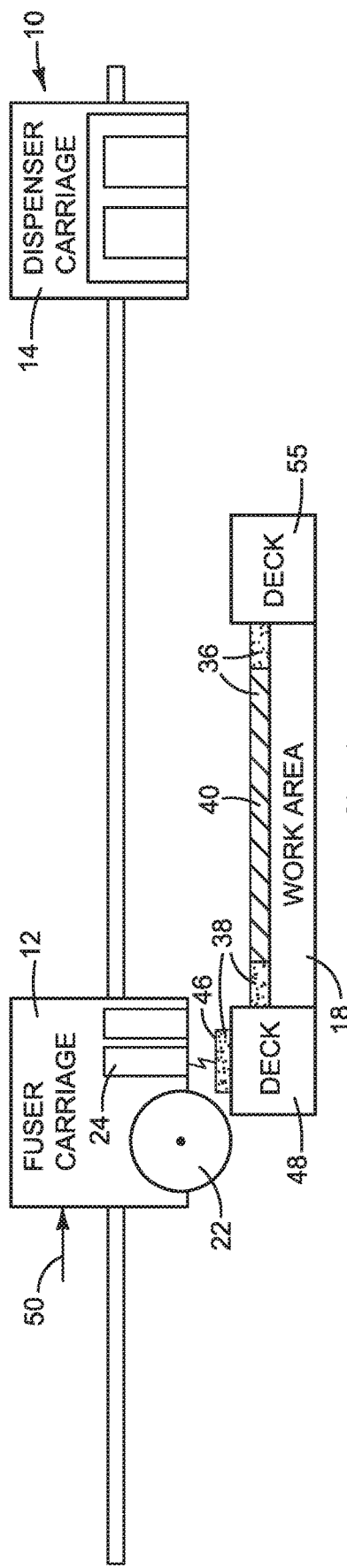

In some additive manufacturing processes, heat is used to fuse together the particles in a powdered build material to form a solid object. Heat to fuse the build material may be generated, for example, by applying a liquid fusing agent to a thin layer of powdered build material in a pattern based on the object slice and then exposing the patterned area to fusing light. Light absorbing components in the fusing agent absorb light energy to help sinter, melt or otherwise fuse the build material. The process is repeated layer by layer and slice by slice to complete the object.

A new fusing system has been developed for additive manufacturing to help speed the formation of each object slice, and thus reduce overall manufacturing times, while lowering powder temperatures for faster cooling and less caking. In one example, the fusing system includes two carriages that move back and forth over the work area along the same line of motion so that one carriage can follow the other carriage across the work area. A "fuser" carriage carries a layering device to layer build material over the work area, a heating lamp to heat layered build material, and a fusing lamp to irradiate build material with fusing light. The heating lamp is positioned on the fuser carriage downstream from the layering device (in the layering direction). The fusing lamp is positioned downstream from the heating lamp. A "dispenser" carriage carries the agent dispenser to dispense a fusing agent on to each layer of build material.

A dual carriage fusing system in which the carriages move along the same line of motion helps enable faster slew speeds and overlapping functions in each pass. For example, in a first pass, as the fuser carriage moves over the work area, the heating lamp is on to heat the underlying layer/slice in front of the layering device as the layering device forms the next layer of build material. In a second pass, as the fuser carriage moves back over the work area, the heating lamp is on to heat the new layer of build material in advance of the dispenser carriage, which follows the fuser carriage over the work area to dispense fusing and/or detailing agents on to the heated build material in a pattern based on the next object slice. In a third pass, the dispenser carriage moves back over the work area to dispense fusing and/or detailing agents on to the build material, followed by the fuser carriage with the fusing lamp on to expose patterned build material to fusing light. In a fourth pass, as the fuser carriage moves back over the work area, the fusing light is on to expose patterned build material to fusing light. The four pass process may be repeated for successive layers of build material as the object is manufactured layer by layer and slice by slice.

These and other examples described below and shown in the figures illustrate but do not limit the scope of the patent, which is defined in the Claims following this Description.

As used in this document: "and/or" means one or more of the connected things; a "fusing agent" means a substance that causes or helps cause a build material to sinter, melt or otherwise fuse; a "detailing agent" means a substance that inhibits or prevents or enhances fusing a build material, for example by modifying the effect of a fusing agent; "light" means electromagnetic radiation of any wavelength; a "lamp" means any device that emits light; and "work area" means any suitable structure to support or contain build material for fusing, including underlying layers of build material and in-process slice and other object structures.

FIGS. 1 and 2 are elevation and plan views, respectively, illustrating one example of a fusing system 10 for an additive manufacturing machine. FIGS. 3-26 present a sequence of views showing one example of a four pass fusing cycle using system 10. Referring first to FIGS. 1 and 2, fusing system 10 includes a first, "fuser" carriage 12 and a second, "dispenser" carriage 14. Carriages 12 and 14 move back and forth, for example on rails 16, over a work area 18 along a line of motion 20. Fuser carriage 12 carries a layering device 22, a heater 24, and a fusing lamp 26. Dispenser carriage 14 carries an inkjet printhead assembly or other suitable fluid dispensing assembly 28 to dispense a fluid fusing agent. In the example shown, dispensing assembly 28 includes a first dispenser 30 to dispense a fusing agent and a second dispenser 32 to dispense a detailing agent.

In the example shown in FIGS. 1 and 2, layering device 22 is implemented as a roller 22 that moves between a deployed position (shown in FIG. 3) to layer build material as carriage 12 moves over work area 18 and a retracted position (shown in FIG. 1) to not layer build material as carriage 12 moves over work area 18. Layering roller 22 may rotate freely as it is moved over work area 18, freewheeling clockwise or counter-clockwise depending on the direction of travel, or roller 22 may be driven rotationally in either direction (co-rotated or counter-rotated). Other implementations for a layering device 22 are possible including, for example, a blade or a device that dispenses build material directly over the work area in a layer.

Heater 24 may be implemented as a heating lamp 24, for example. Although a single heating lamp 24 is depicted, multiple heating lamps may be used, for example to enable more versatile heating. Similarly, although a single fusing lamp 26 is depicted, multiple fusing lamps may be used, for example to enable a greater range of fusing light. While the characteristics of heating lamp 24 and fusing lamp 26 may vary depending on characteristics of the build material and fusing agent (and other process parameters), it is expected that a lower color temperature heating lamp 24 and a higher color temperature fusing lamp 26 usually will be desirable to better match the spectral absorption of the untreated and treated build material, respectively. For example, for a white polyamide powdered build material 38 and a black liquid fusing agent, an 1800° K heating lamp 24 may be used to pre-heat the untreated build material powder and a 2750° K fusing lamp used for greater power transfer to build material treated with fusing agent and less to the untreated powder.

As noted above, work area 18 represents any suitable structure to support or contain build material for fusing, including underlying layers of build material and in-process slice and other object structures. For a first layer of build material, for example, work area 18 may be formed on the surface of a platform 34 that moves up and down to accommodate the layering process. For succeeding layers of build material, for example as shown in FIG. 1, work area 18 may be formed on an underlying object structure 36, which may include unfused build material 38 and build material that has been fused into an object slice 40.

Figure 4:
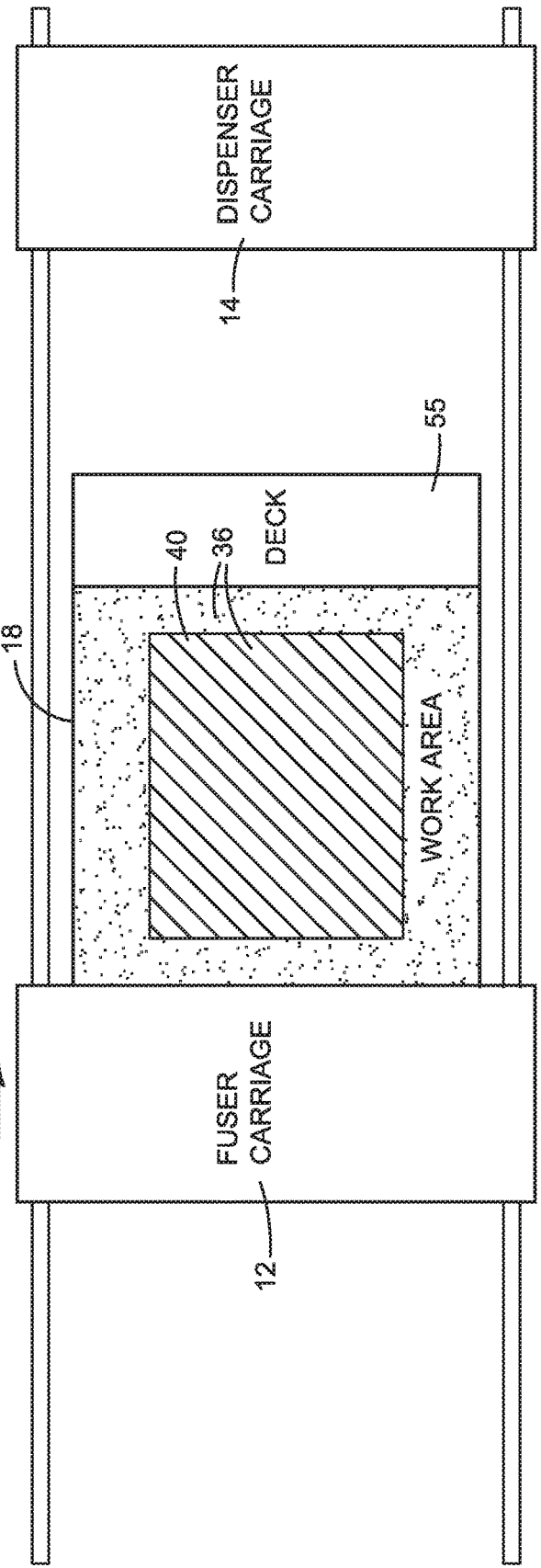
Figure 5:
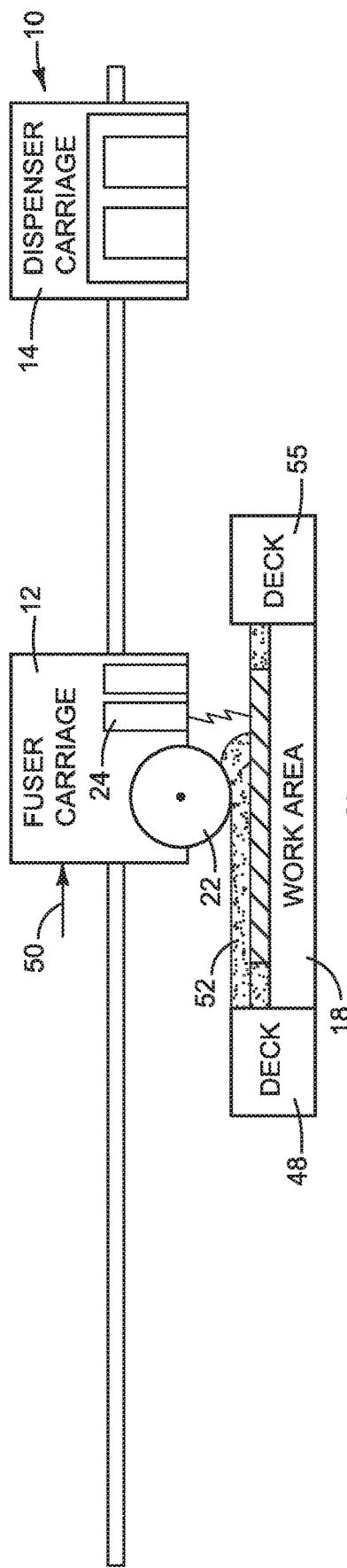
Figure 6:
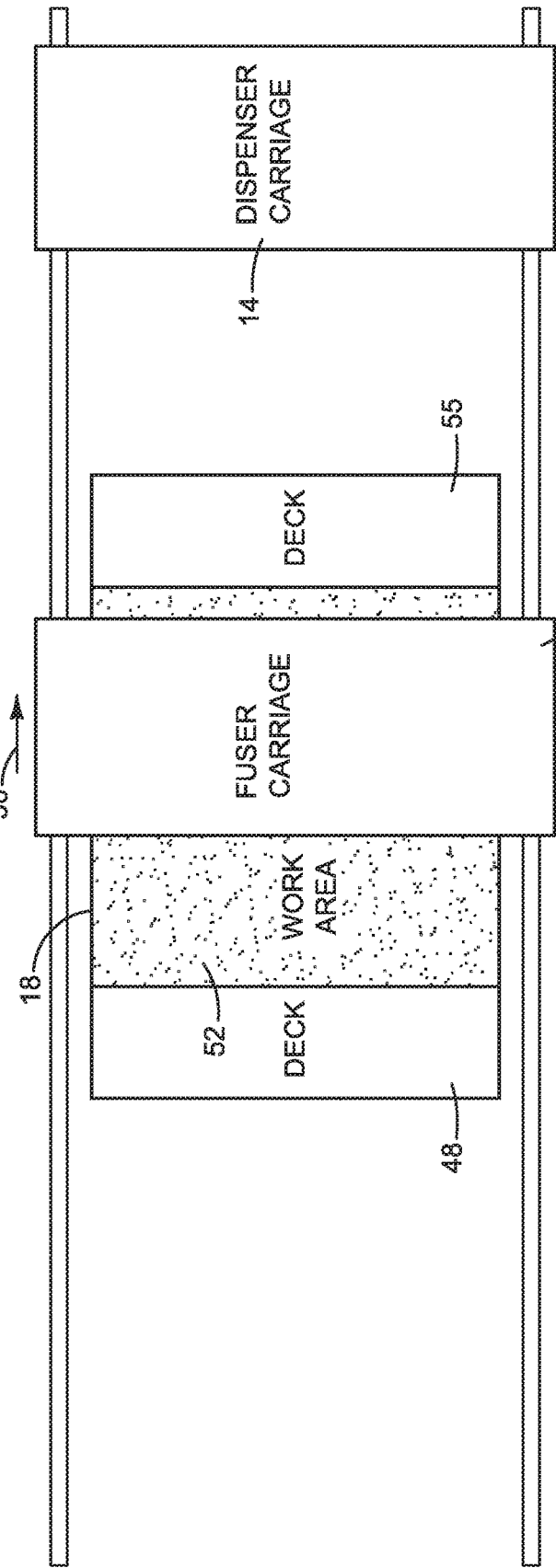

In FIGS. 1 and 2, fuser carriage 12 is parked on one side 42 of work area 18 (the left side in FIGS. 1 and 2) and dispenser carriage 14 is parked on the other side 44 of work area 18 (the right side in FIGS. 1 and 2). In this example, a ribbon 46 of build material powder 38 has been deposited along a left side deck 48 adjacent to work area 18. In FIGS. 3 and 4, layering roller 22 is deployed, heating lamp 24 is turned on to heat the powder in ribbon 46 and fuser carriage 12 is moving to the right in a first pass, as indicated by motion arrows 50. In FIGS. 5 and 6, as fuser carriage 12 continues moving to the right in the first pass, heating lamp 24 heats underlying object structure 36 while roller 22 layers build material 38 in a layer 52 over underlying structure 36. Although a powdered build material 38 is depicted by stippling in the figures, any suitable build material may be used.

Figure 7:
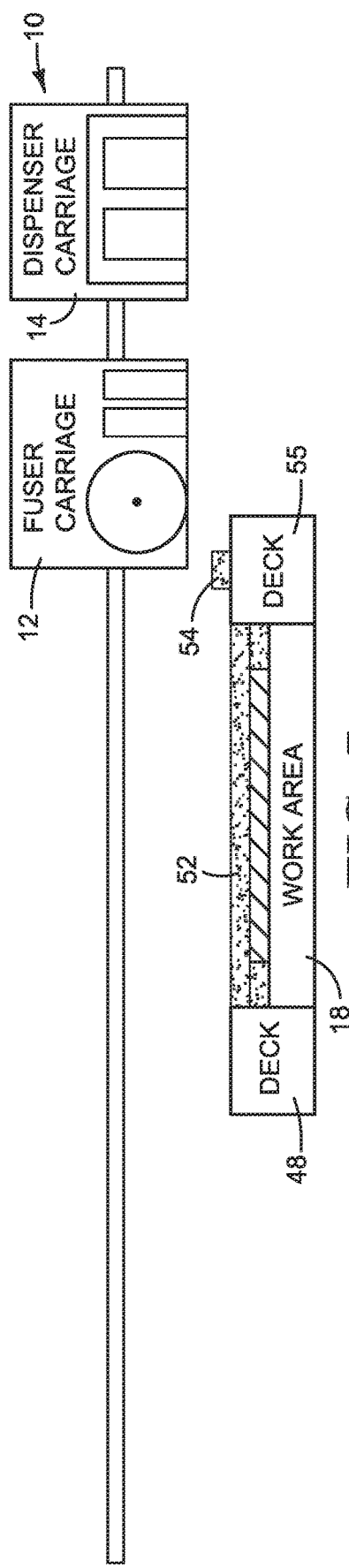
Figure 8:
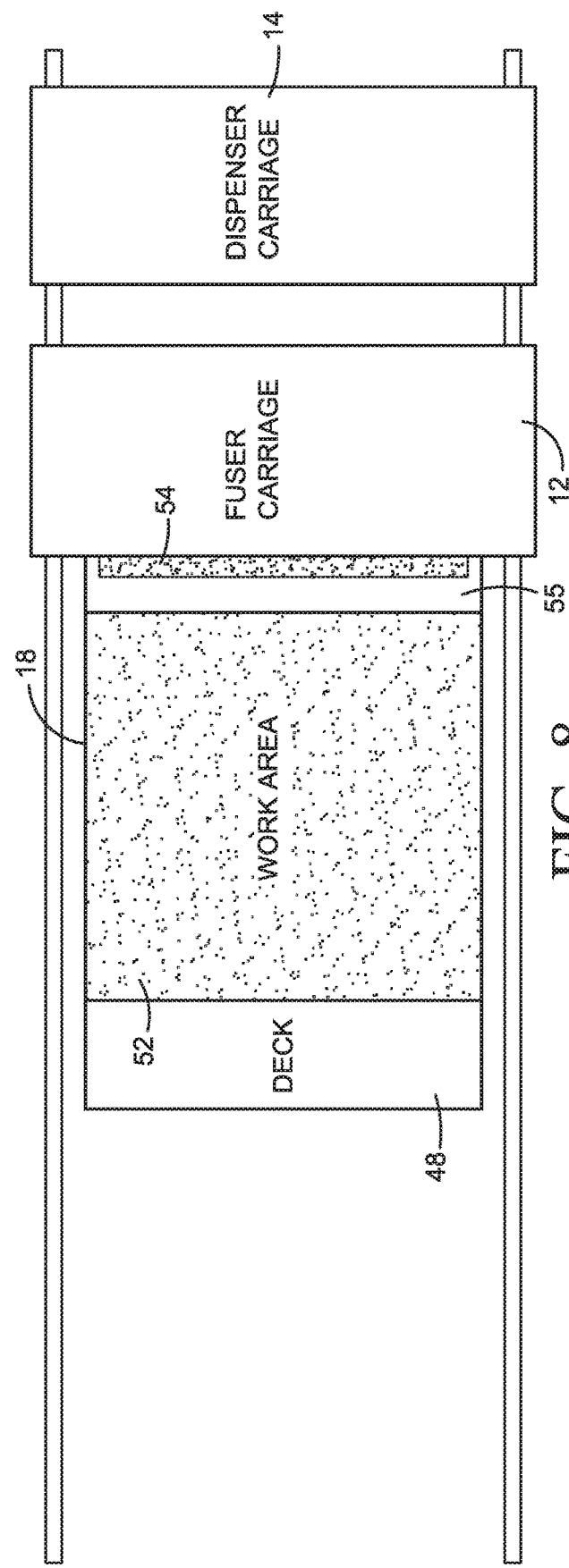
Figure 11:
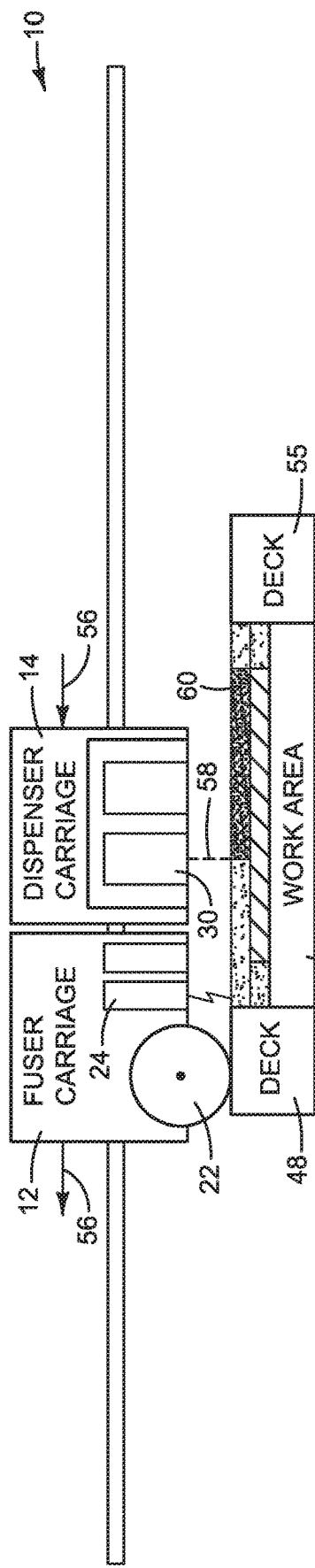
Figure 12:
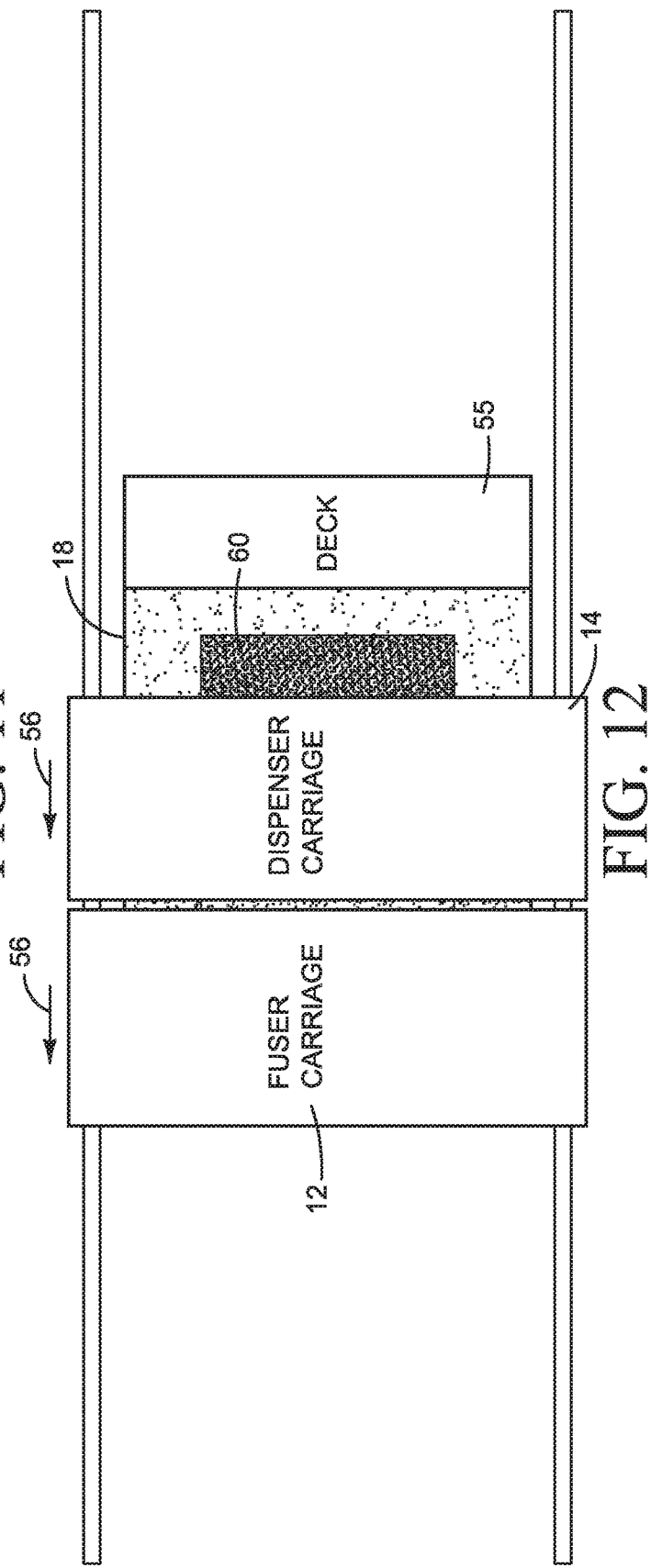

In FIGS. 7 and 8, fuser carriage 12 has reached the right side of work area 18 after covering underlying structure 36 with layer 52. In the example shown in FIGS. 7 and 8, layering roller 22 has been retracted to jump over a strip 54 of excess build material 38 on right deck 55 in preparation for re-layering the excess build material in a second pass. In FIGS. 9-10 and 11-12, as fuser carriage 12 moves to the left in a second pass, indicated by motion arrows 56, layering roller 22 is deployed to re-layer excess build material in layer 52 and heating lamp 24 is turned on to heat build material 38 in layer 52. Also in the second pass, dispenser 30 on dispenser carriage 14 following fuser carriage 12 dispenses a fusing agent 58 on to build material 38 in layer 52 in a pattern 60 corresponding to the desired object slice.

Figure 13:
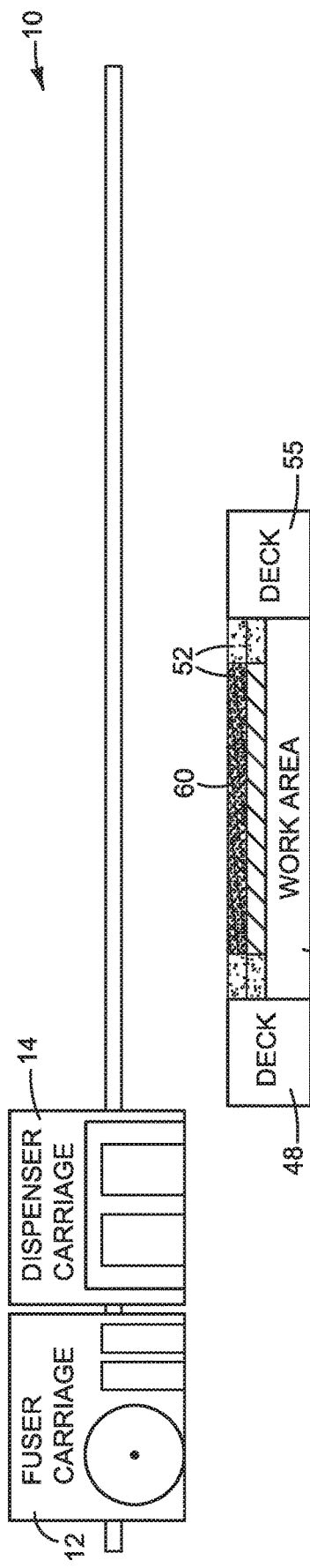
Figure 14:
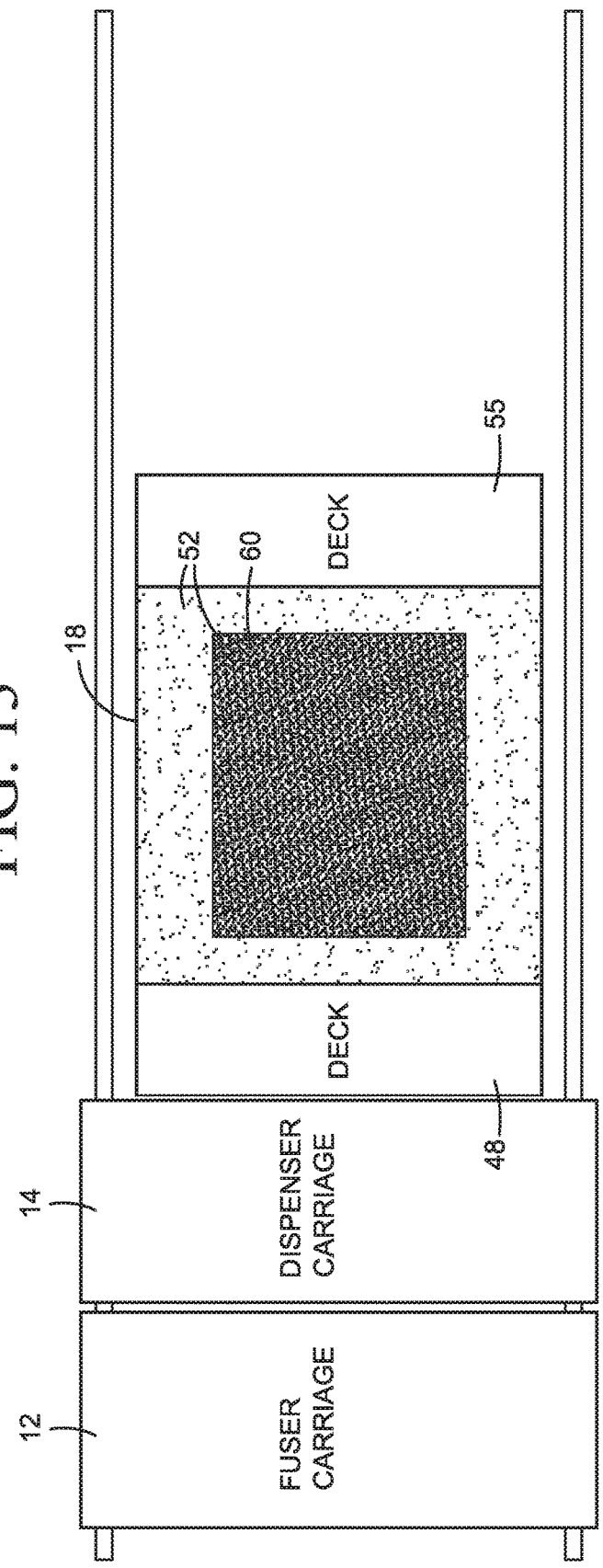

In FIGS. 13 and 14, fuser carriage 12 and dispenser carriage 14 have reached the left side of work area 18 after patterning build material 38 in layer 52 with fusing agent 58. In FIGS. 15-16 and 17-18, as dispenser carriage 14 moves to the right in a third pass, indicated by motion arrows 62, dispenser 32 dispenses a detailing agent 64 on to build material 38 in layer 52. Also in the third pass, fusing lamp 26 is turned on to irradiate patterned build material 60 with fusing light to fuse or begin to fuse patterned build material into an object slice 66.

Figure 19:
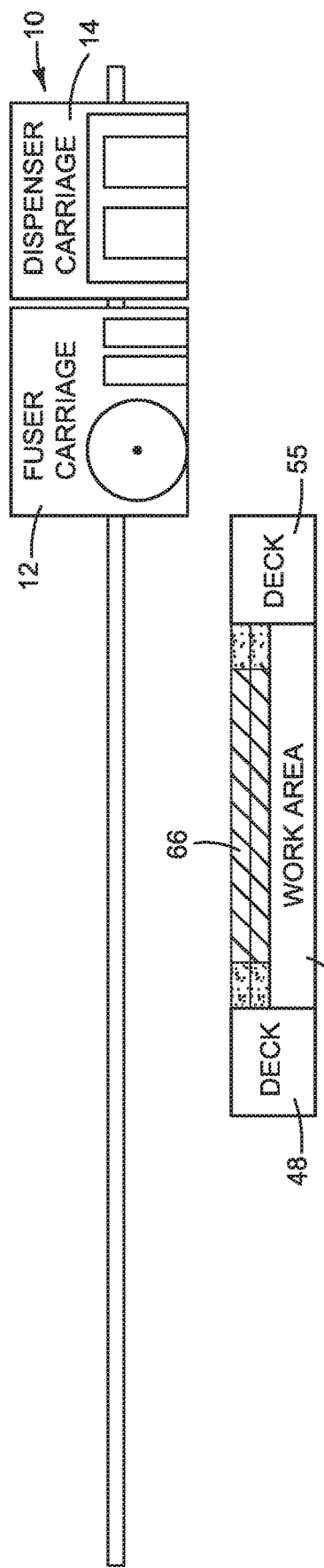
Figure 20:
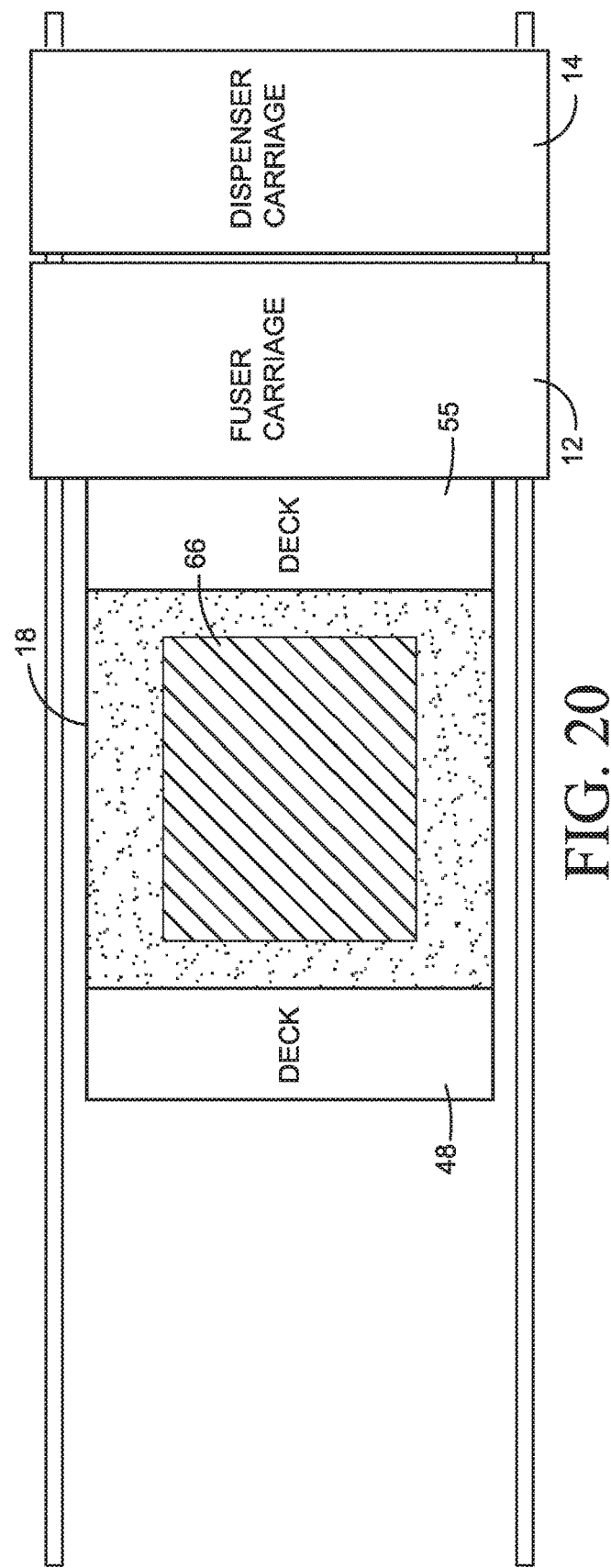

In FIGS. 19 and 20, fuser carriage 12 and dispenser carriage 14 have reached the right side of work area 18 after forming slice 66 in build material layer 52. In FIGS. 21 and 22, dispenser carriage 14 remains parked while fuser carriage 12 moves to the left in a fourth pass, indicated by motion arrows 68, with fusing lamp 26 turned on to irradiate patterned build material 60 including slice 66. Depending on the degree of fusing in the third pass (shown in FIGS. 17 and 18), the fusing light applied in the fourth pass may complete slice 66 as depicted in FIGS. 19 and 20 or further fuse patterned build material 60 toward completion of slice 66, for example in advance of the first (next) pass with fusing lamp 26 turned on to irradiate slice 66 with more fusing light as shown in FIG. 25.

Figure 23:
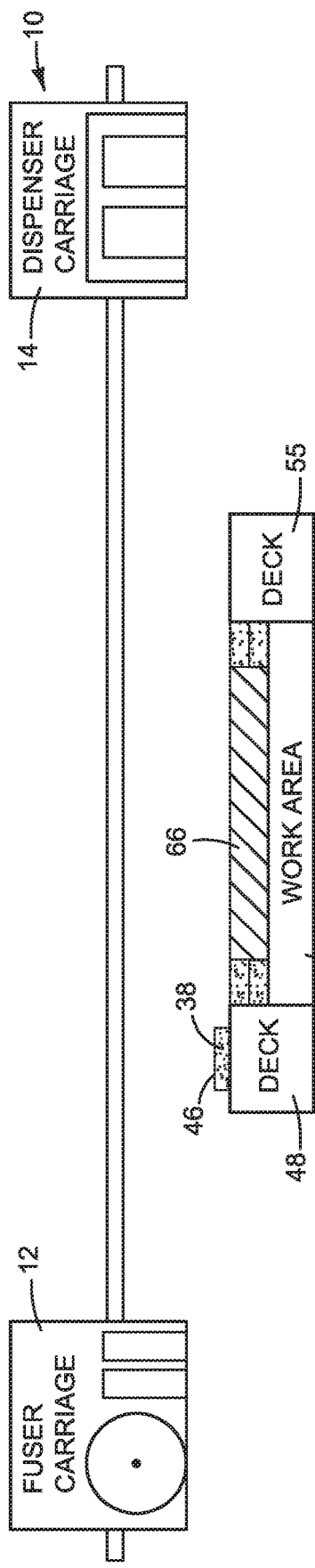
Figure 24:
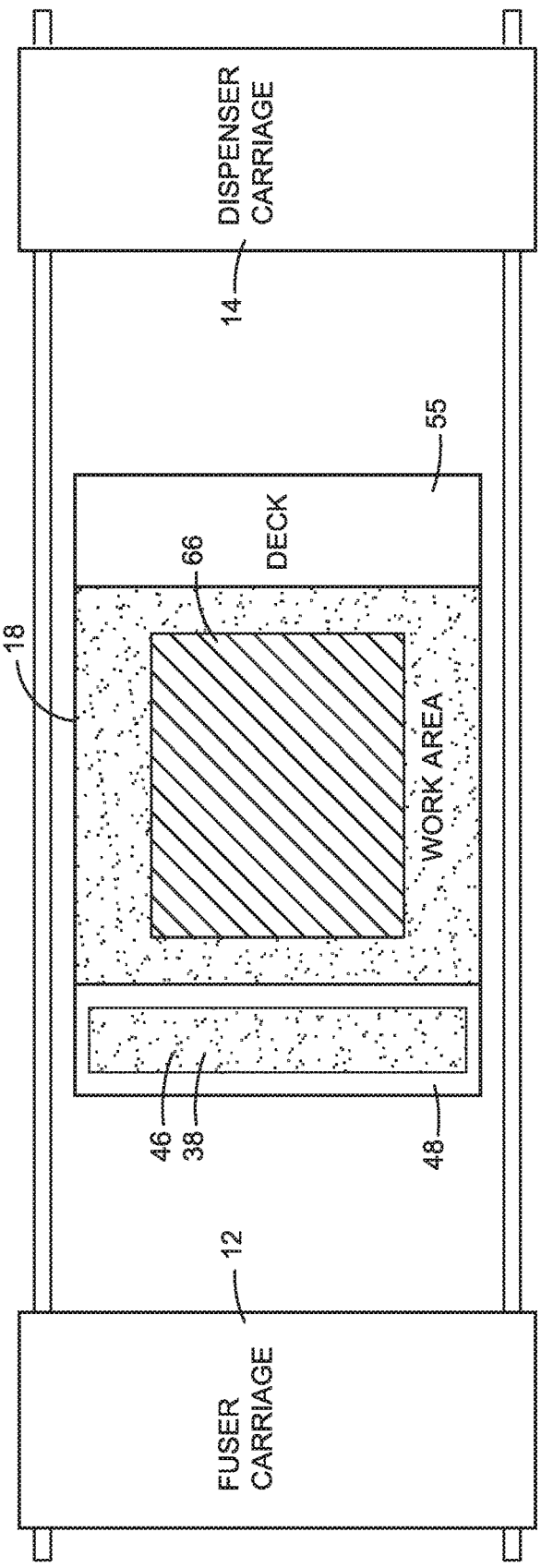

In FIGS. 23 and 24, fuser carriage 12 is parked on the left side of work area 18 after the fourth pass, dispenser carriage 14 is still parked on the right side of work area 18, and a ribbon 46 of build material has been dispensed to deck 48 in preparation for forming the next layer of build material over work area 18. In FIGS. 25 and 26, as fuser carriage 12 is moving to the right, fusing lamp 26 is turned on to irradiate slice 66 with fusing light, heating lamp 24 is turned on to heat the new underlying object structure 72 while roller 22 layers build material 38 in the next layer 74 over underlying structure 72.

The sequence of operations may continue for each succeeding layer of build material, slice by slice, to complete the object.

Other processing and system configurations are possible. For example, where an UV (ultraviolet) fusing lamp 26 is used with a UV curable fusing agent 58 to fuse build material 38, a heating lamp 24 may be omitted. For another example, layering roller 22 could be retracted throughout the second pass (FIGS. 9 and 10), such as when re-layering build material is not desired and/or to help protect dispensers 30, 32 against contamination by airborne dust from a powdered build material. More or fewer agent dispensers are possible to dispense more or fewer agents. Also, the sequence of dispensing fusing and detailing agents may vary from that shown.

Figure 27:
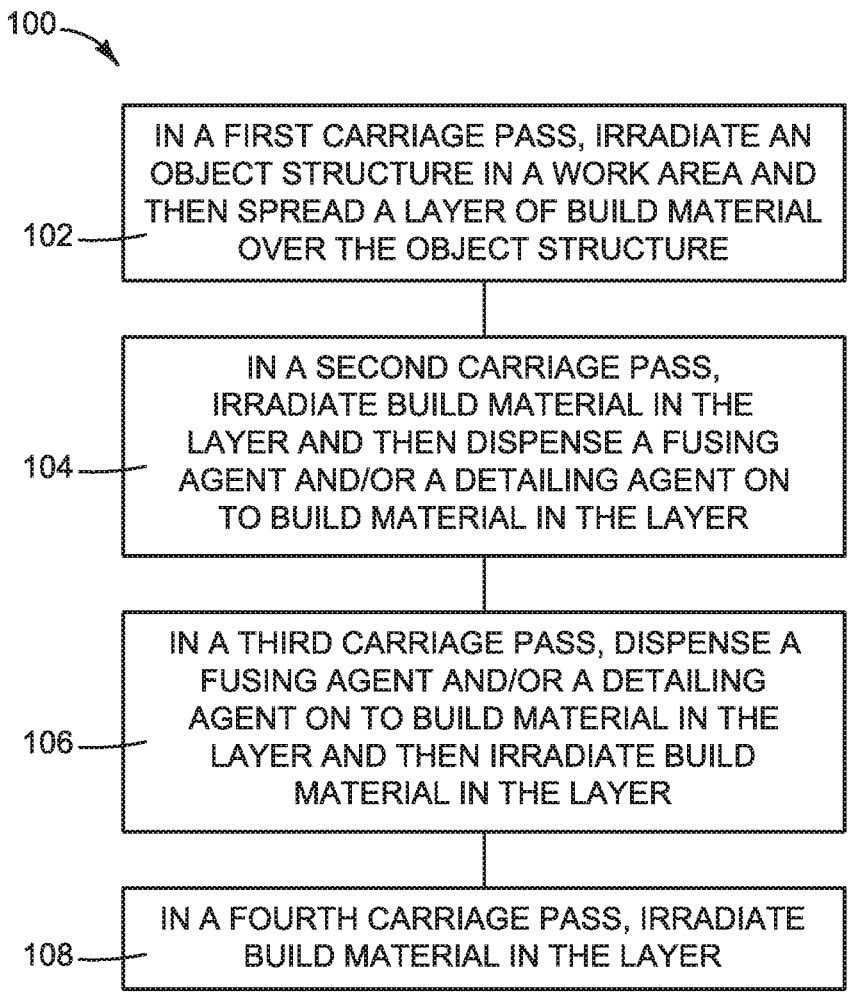
FIG. 27 is a flow diagram illustrating one example of a process for additive manufacturing, such as might be implemented with the fusing system of FIGS. 1 and 2.

FIG. 27 illustrates one example of a process 100 for additive manufacturing, such as might be implemented with a fusing system 10 shown in FIGS. 1 and 2. Referring to FIG. 27, in a first carriage pass, an in-process object structure is irradiated and then a layer of build material is formed over the object structure (block 102), for example as described above with reference to FIGS. 3-6. In a second carriage pass, build material in the layer is irradiated and then a fusing agent and/or a detailing agent is dispensed on to build material in the layer (block 104), for example as described above with reference to FIGS. 9-12. In a third carriage pass, a fusing agent and/or a detailing agent is dispensed on to build material in the layer and then build material in the layer is irradiated (block 106), for example as described above with reference to FIGS. 15-18. In a fourth carriage pass, build material in the layer is irradiated (block 108), for example as described above with reference to FIGS. 21 and 22.

Figure 28:
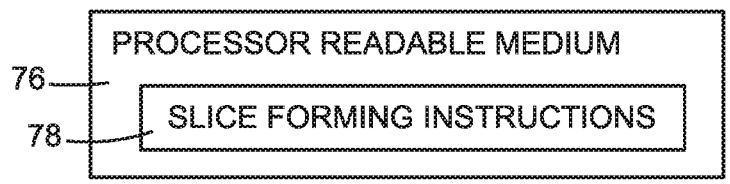
FIG. 28 is a block diagram illustrating one example of a processor readable medium with instructions thereon to help form an object slice during additive manufacturing a 3D object.

FIG. 28 is a block diagram illustrating a processor readable medium 76 with instructions 78 to help form an object slice during the manufacture of a 3D object.

In one example, slice forming instructions 78 include instructions to:

in a first pass over a work area, apply fusing energy to build material in a first layer of build material treated with a fusing agent, then heat untreated build material in the first layer of build material, and then cover the first layer of build material with a second layer of build material, for example as described above with reference to FIGS. 25 and 26;

in a second pass over the work area, heat build material in the second layer and then treat heated build material in the second layer with a fusing agent and/or a detailing agent, for example as described above with reference to FIGS. 9-12;

in a third pass over the work area, treat build material in the second layer with a fusing agent and/or a detailing agent and then apply fusing energy to treated build material in the second layer, for example as described above with reference to FIGS. 15-18; and then in a fourth pass over the work area, apply fusing energy to treated build material in the second layer, for example as described above with reference to FIGS. 21 and 22.

In another example, slice forming instructions 78 in FIG. 28 includes instructions to execute the process illustrated in FIG. 27.

Processor readable medium 76 with slice forming instructions 78 may be implemented, for example, in a CAD computer program product, in an object model processor, or in a controller for an additive manufacturing machine. Control data to form a slice in a four pass sequence such as that shown in FIGS. 1-26 may be generated, for example, by processor readable instructions on the source application, usually a CAD computer program product, in an object model processor, or by processor readable instructions on the additive manufacturing machine.

Figure 29:
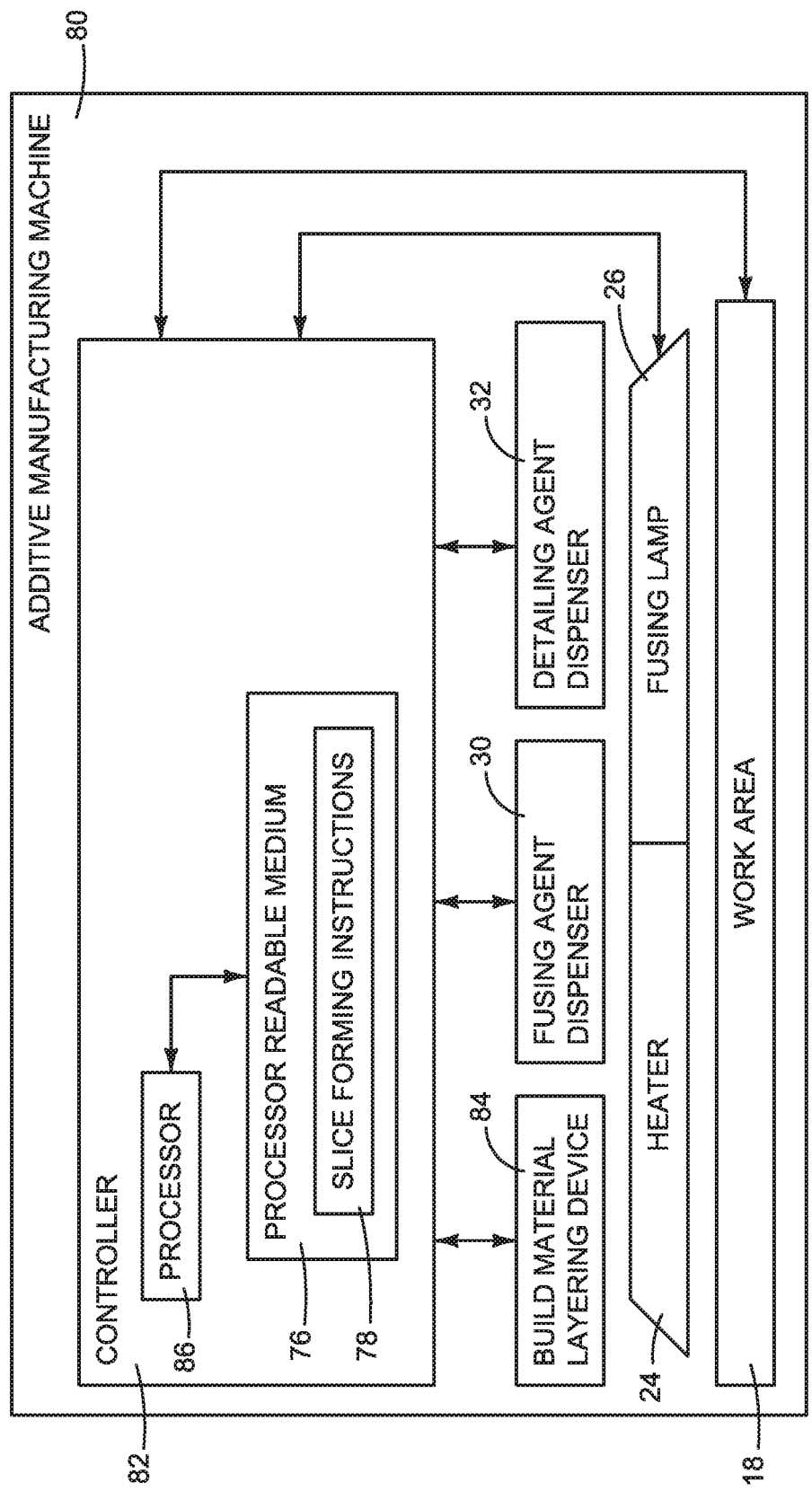
FIG. 29 is a block diagram illustrating one example of an additive manufacturing machine implementing a controller with instructions to help form an object slice during additive manufacturing a 3D object.

FIG. 29 is a block diagram illustrating one example of an additive manufacturing machine 80 implementing a controller 82 with slice forming instructions 78. Referring to FIG. 29, machine 80 includes controller 82, a work area 18, a build material layering device 84, a fusing agent dispenser 30, a detailing agent dispenser 32, a heater 24 and a fusing lamp 26. Build material layering device 84 layers build material over work area 18 and may include, for example, a device to dispense the build material and a blade or roller 22 to spread the build material for each layer. Fusing agent dispenser 30 and detailing agent dispenser 32 dispense their respective agents selectively at the direction of controller 82, for example as described above with reference to FIGS. 11-12 and 15-16. While any suitable dispensers 30, 32 may be used, inkjet printheads are sometimes used in additive manufacturing machines because of the precision with which they can dispense agents and their flexibility to dispense different types and formulations of agents.

Controller 82 represents the processor (or multiple processors), the associated memory (or multiple memories) and instructions, and the electronic circuitry and components needed to control the operative elements of machine 80. In particular, controller 82 includes a processor readable medium 76 with slice forming instructions 78 and a processor 86 to read and execute instructions 78.

The examples shown in the figures and described above illustrate but do not limit the patent, which is defined in the following Claims.

"A", "an" and "the" used in the claims means at least one. For example, "a fusing lamp" means one or more fusing lamps and subsequent reference to "the fusing lamp" means the one or more fusing lamps.

The invention claimed is:

1. A fusing system for an additive manufacturing machine, comprising:
   a first carriage carrying a layering device, a heating lamp, and a fusing lamp, the first carriage movable back and forth over a work area along a line of motion in a first direction and in a second direction opposite the first direction;
   a second carriage carrying an agent dispenser, the second carriage movable back and forth over the work area along the line of motion in the first direction and in the second direction;
   a controller operatively connected to the first carriage, the heating lamp, the fusing lamp, the second carriage, and the agent dispenser, the controller including processor executable instructions to:
   while moving the first carriage over the work area in the first direction in a first pass, layer build material over an object structure to form a layer of build material;
   while moving the first carriage and the second carriage over the work area in the second direction in a second pass, irradiate build material in the layer with the heating lamp and then dispense a first fusing agent and/or a first detailing agent on to build material in the layer with the agent dispenser;
   while moving the second carriage and the first carriage over the work area in the first direction in a third pass, dispense a second fusing agent the same as or different from the first fusing agent and/or a second detailing agent the same as or different from the first detailing agent on to build material in the layer with the agent dispenser and then irradiate build material in the layer with the fusing lamp; and
   while moving the first carriage back over the work area in the second direction in a fourth pass, irradiate build material in the layer with the fusing lamp.

2. The system of claim 1, where the controller includes processor executable instructions to repeat the sequence of layering, irradiating and dispensing, dispensing and irradiating, and irradiating, for multiple successive layers of build material.

3. The system of claim 1, where the controller includes processor executable instructions to, while moving the first carriage over the work area in the first direction in the first pass, irradiate the object structure with the heating lamp before build material is layered over the object structure.

4. The system of claim 1, where the controller includes processor executable instructions to, while moving the first carriage over the work area in the first direction in the first pass, irradiate the object structure with the fusing lamp before build material is layered over the object structure.

5. The system of claim 1, where the controller includes processor executable instructions to, while moving the first carriage over the work area in the first direction in the third pass, irradiate build material in the layer with the heating lamp.

\* \* \* \* \*